Nov. 23, 1971     W. H. KNAPP ET AL     3,621,850
                  CONVERTIBLE ROTOR
Filed Jan. 6, 1970                    3 Sheets-Sheet 1
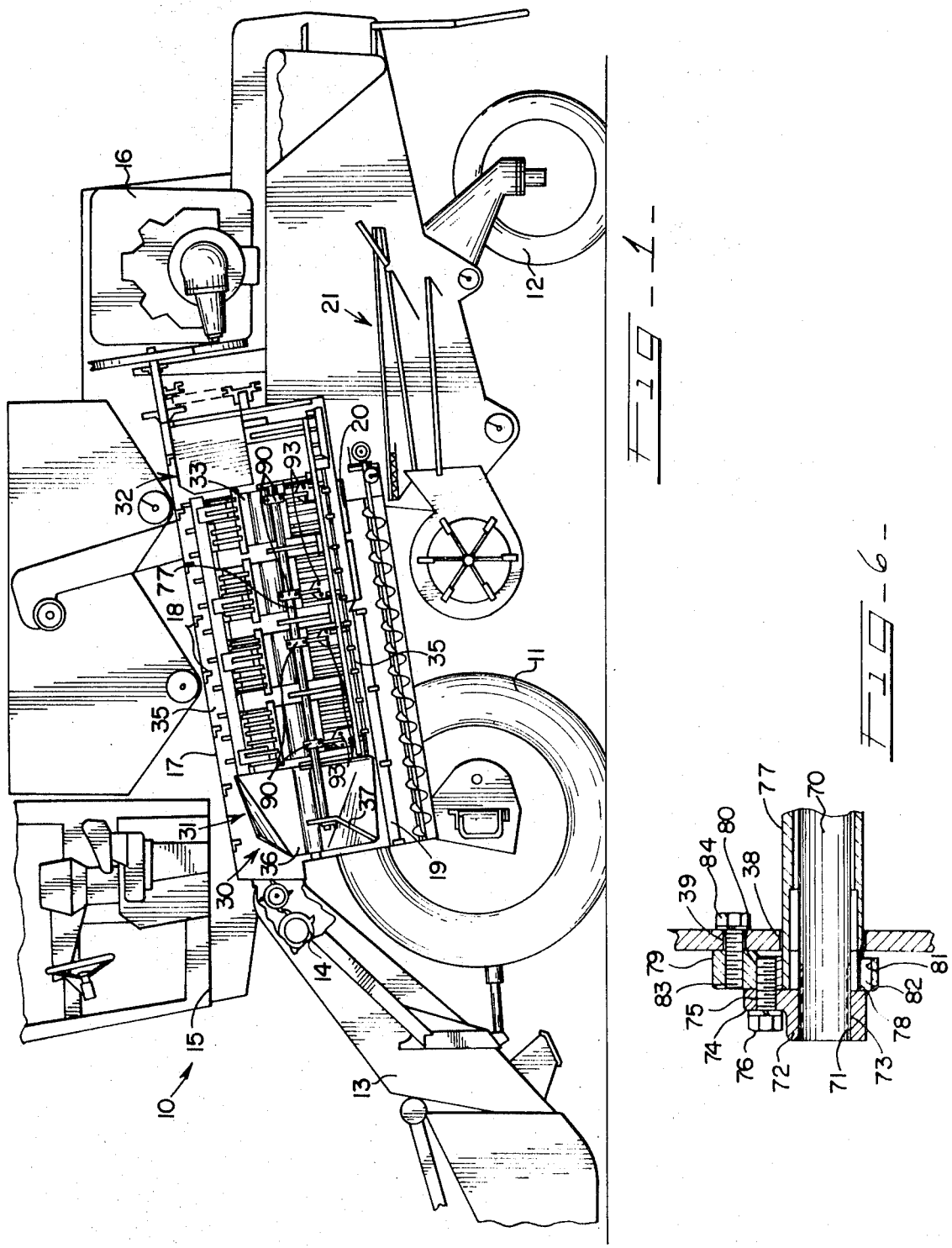
INVENTORS
WILLIAM H. KNAPP
RICHARD L. WOOD
BY *[signature]* ATT'Y.

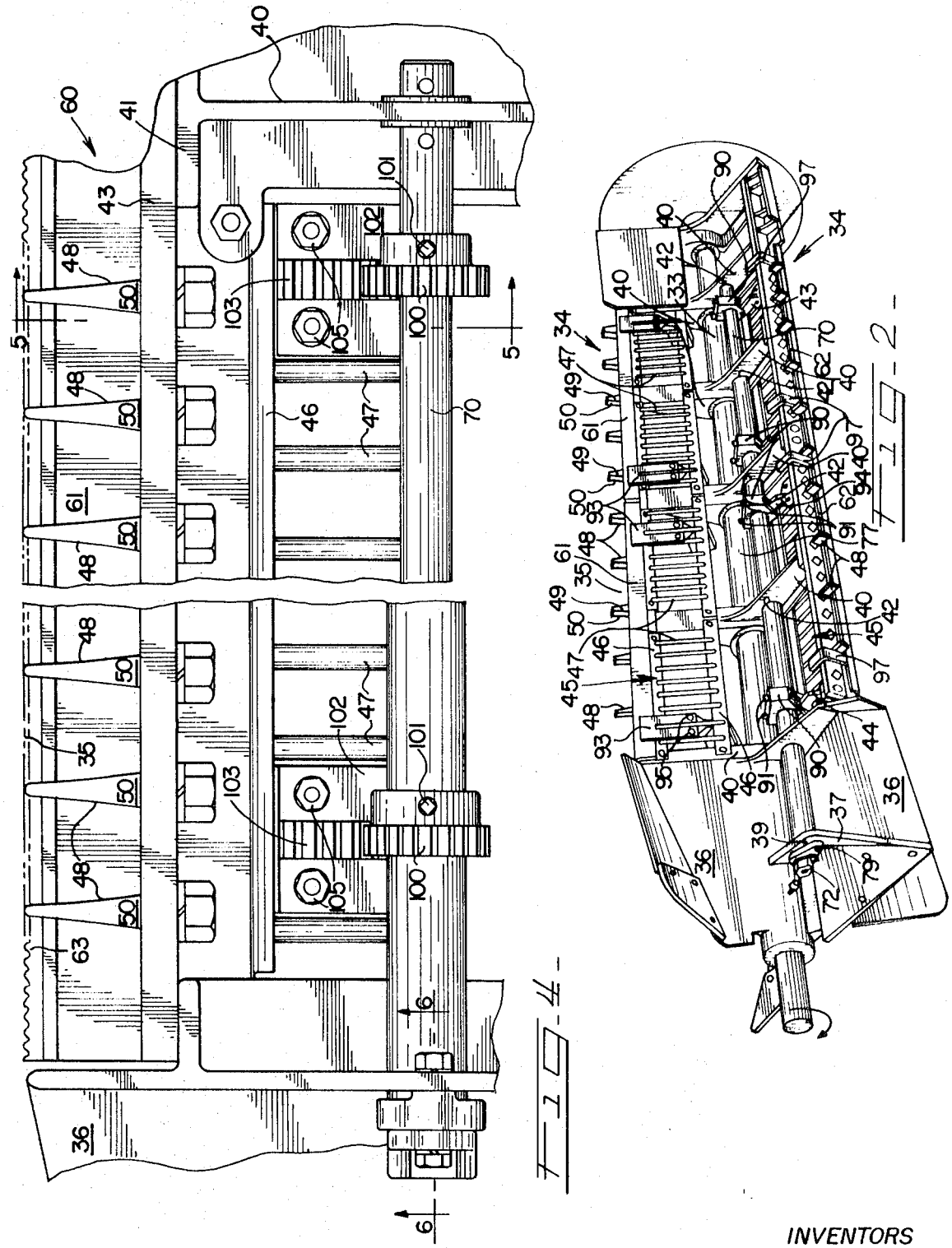

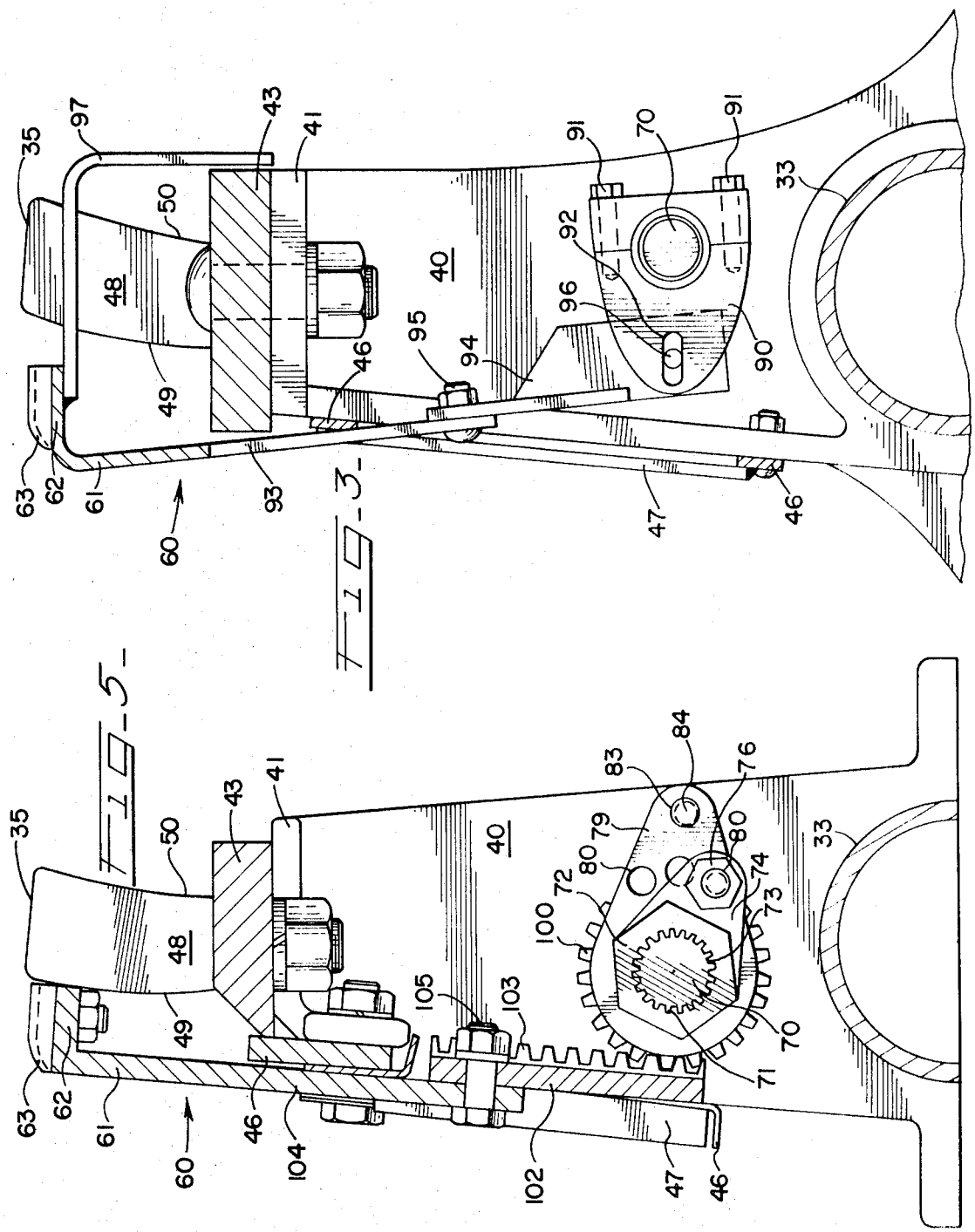

United States Patent Office 3,621,850
Patented Nov. 23, 1971

3,621,850
CONVERTIBLE ROTOR
William H. Knapp, Davenport, Iowa, and Richard L. Wood, El Dorado Springs, Mo., assignors to International Harvester Company, Chicago, Ill.
Filed Jan. 6, 1970, Ser. No. 995
Int. Cl. A01f 12/22
U.S. Cl. 130—27 R      16 Claims

ABSTRACT OF THE DISCLOSURE

A rotor for an axial flow combine having spike teeth protruding from its outer periphery and adjustable spike teeth covers that can be positioned to cover a selected portion of the spike teeth to thus change the threshing characteristic of the rotor. The spike teeth covers are divided lengthwise of the rotor so that one end of the rotor can be adjusted to be less aggressive than the other.

BACKGROUND OF THE INVENTION

The present invention relates generally to improvements in combines and the like and more particularly to a new and improved rotor for a rotary or axial flow-type combine.

In commercially available combines, the material to be threshed is fed between a rotary cylinder and a stationary concave in a direction normal to the axis of the rotating cylinder. Much of the grain contained in the material fed to the cylinder and concave passes through the concave as threshed grain. The remainder of the material is conveyed to the separating components of the combine, which in conventional combines includes reciprocating or oscillating straw racks, return pans and chaffer sieves. In the combine described in the subject application, an elongated rotor is provided along the longitudinal axis of the combine. The elongated rotor is enclosed within a cylinder having transport fins provided along its internal upper surface and a concave and grate provided along its lower surface. The material to be threshed is fed into the front end of the cylinder and is metered axially towards the rear for processing by the cooperating elements of the rotor and cylinder. An axial flow-type combine, such as this, has the obvious advantage over the conventional combine in the simplicity of its drive. In axial flow combines, the threshing and separating are both performed within the cylinder through the action of the rotor. The threshing and separating characteristics of the rotor are a function of the rotor's outer periphery. When harvesting some materials, optimum threshing and separating will be obtained through the use of spike teeth along the outer periphery of the rotor. However, for other materials, optimum threshing and separating will be obtained through the use of a smooth outer surface, or an outer surface comprised of rasp bars. Furthermore, for some materials, such as corn, it is desirable to have a rotor that is less aggressive at the forward end than at the rear end, such that the kernels are removed at the forward end of the rotor and the cobs are then ground when they reach the rear end.

Description of the prior art

In the prior art there are rotors having outer peripheries of various characteristics, however, the characteristic cannot be changed without reconstructing the rotor. In the prior art devices, one rotor could, of course, be substituted for another, or a rotor removed rebuilt to have a different characteristic and then replaced. Prior art rotors of the above referred to type are shown in the following patents: Schlayer No. 1,688,662 of Oct. 23, 1928, Bunting No. 2,493,105 of Jan. 3, 1950 Knapp et al. No. 3,464,419 of Sept. 2, 1969 and Rowland-Hill et al. Ser. No. 576,151 filed on Aug. 30, 1966.

SUMMARY

The general purpose of this invention is to provide a rotor for an axial flow combine which embraces all the advantages of similarly employed rotors and can be easily adjusted to change its characteristics and to thereby accommodate various crops and crop conditions. To attain this, the present invention contemplates a unique rotor having spike teeth mounted along its outer periphery and spike teeth covers that can be adjusted relative to the spike teeth to completely shield them, to completely expose them or some intermediate position. The spike teeth covers are arranged in independent sections axially of the rotor and they are independently adjustable such that the front end of the rotor can be adjusted to have a less aggressive characteristic than the rear end. The spike teeth covers can be adjusted while the rotor remains in operative positive and thus, it is not necessary to remove or replace the rotor when changing from one crop or crop condition to another. For some crops and crop conditions optimum threshing and separating is obtained by exposing the spike teeth on the rotor and providing stationary spike teeth that protrude internally from the cylinder, while for other crops and crop conditions optimum threshing is obtained with the stationary spike teeth removed. These stationary spike teeth are easily mounted and removed from the internal surface of the cylinder and of course, must be removed before the spike teeth covers are used in the extended position. Reference is hereby made to the co-pending Knapp et al. application filed Jan. 6, 1970, Ser. No. 996, entitled Spike-Tooth Rotor, for a more complete disclosure of removably mounted stationary spike teeth.

It is an object of the present inventing to provide a rotor for an axial flow combine that can be adjusted to expose an outer periphery of various characteristics such that the rotor can optimumly thresh and separate a variety of crops.

BRIEF DESCRIPTION OF THE DRAWING

FIG. 1 is a side view of an axial flow combine having portions broken away to expose the rotor;

FIG. 2 is a pictorial view of the rotor removed from the combine;

FIG. 3 is a cross-sectional view of a blade of the rotor showing a first embodiment of the spike teeth cover;

FIG. 4 is a side view of a blade of the rotor showing a second embodiment of the spike teeth cover;

FIG. 5 is a cross-sectional view of a blade taken along line 5—5 of FIG. 4 with the control arm superimposed; and FIG. 6 is a cross-sectional view taken through lines 6—6 of FIG. 4.

DESCRIPTION OF THE PREFERRED EMBODIMENTS

Referring now to the drawings wherein like reference characters designate like or corresponding parts throughout the several views there is shown in FIG. 1 an axial flow combine designated 10 having drive wheels 11, guide wheels 12, and a header 13. A portion of the header 13 is broken away to expose the conveyor 14. The combine 10 also includes an operator's platform 15 and an engine 16. A tubular casing 17 extends longitudinally of the combine 10 and has transport fins 18 protruding from its upper internal surface. The bottom forward portion of the tubular casing 17 is formed of a concave 19 and the bottom rearward section is formed of a grate 20. The combine cleaning system is designated 21. A rotor 30 is journaled within the tubular casing 17 and through the cooperation of the rotor 30 and tubular casing 17 the material is threshed and separated, the grain is sent to the cleaning system 21 and the debris is discharged to the ground. For a more complete description of the operation of an axial flow combine, reference should be made to the above-referred to Knapp et al. Pat. No. 3,464,419 and the application to Rowland-Hill et al. Ser. No. 576,151 filed on Aug. 30, 1966.

Referring now to FIGS. 1 and 2, the rotor 30 has a central core 33 and several blades 34 that radiate from the central core 33 and also extend lengthwise of the rotor. The rotor has a forward end 31 and a rear end 32. Each of the blades 34 has an impeller portion 36 located at the forward end 31 of the rotor. Each blade 34 has an outer edge 35 that extends axially of the rotor and is spaced from the central core 33. The rotor 30 rotates in the direction of the arrow appearing in FIG. 2 such that the flanges 37 protrude from the rear surface of the impeller portions 36. For a purpose that shall be further discussed, each flange 37 has an aperture 38 and a series of holes 39 formed therein.

There are a plurality of outwardly extending arms 40 that radiate from the central core 33. Groups of outwardly extending arms 40 are arranged such that they lie in respective planes that are parallel to the central core 33. It should be noted that this plane passes through the flanges 37 of the impeller portions 36 and that apertures 42 formed in the outwardly extending arms 40 are aligned with the apertures 38 formed in the flanges 37. The outwardly extending arms 40 have outer ends 41 spaced from the core 33. A longitudinally extending member 43 for each group is secured to the outer ends 41 and lies within the respective plane. Grates 45 formed of axial and radial bars 46 and 47 respectively are provided along the blades 34. A plurality of spike teeth 48 having leading edges 49 and trailing edges 50 are secured to the longitudinally extending members 43 and protrude radially therefrom with respect to the central core 33.

Each of the blades 34 has a set of associated spike teeth covers 60. The spike teeth covers 60 extend axially of the rotor 30 and as illustrated herein, there is a forward and a rearward cover. Each of the covers 60 has a flat shield portion 61 and a flange portion 62. A rasp bar 63 can be secured to the outer edge of the flange portion 62, however, it should be understood that the rasp bar is optional and that the outer edge of the covers 60 can also be smooth.

Means are provided for adjustably mounting the spike teeth covers 60 on blades 34 such that the covers can be positioned in an extended position (FIGS. 3, 4, 5) at which they completely cover the leading edge 49 of the spike teeth or at a retracted position (FIGS. 1 and 2) at which the leading edge 49 is exposed or at intermediate positions. There is a separate mounting means for each of the spike teeth covers 60 so that, for example, the forward spike teeth cover 60 can be adjusted to cover the spike teeth while the rear spike teeth cover 60 is adjusted to expose the spike teeth.

As can be best seen in FIGS. 2, 4, and 6, an inner longitudinal rod 70 is journaled for rotation in the apertures 42 formed in the outwardly extending arms 40. The inner longitudinal rod 70 (see FIGS. 5 and 6) has external splines 71 at its forward end that mesh with the internal splines 73 of a nut 72. An arm 74 having an aperture 75 formed therein extends radially from the nut 72. As best seen in FIG. 6, a bolt 76 extends through the aperture 75 and into a threaded aperture 80 formed in a lever arm 79.

A tubular outer longitudinal rod 77 of a size to telescopically receive the inner longitudinal rod 70 is journaled for rotation in the apertures 42 formed in the forward outwardly extending arms 40. A lever arm 79 is connected to the forward end of outer longitudinal rod 77 by a key 82 located in an external keyway 78 formed in the rod 77 and an internal keyway 81 formed in the lever arm 79. There are a series of threaded apertures 80 formed in the lever arm 79 that are adapted to receive the bolt 76 to thus lock the inner longitudinal rod 70 to the outer longitudinal rod 77 in a selected relative angular position. A bolt 84 can be inserted through one of the holes 39 and screwed into a threaded aperture 83 formed in lever arm 79 to thus lock the outer longitudinal rod 77 in a selected angular position relative to a flange 37 of a blade 34. Thus, the associated forward and rear spike teeth covers 60 can be simultaneously adjusted by removing the bolt 84, inserting it through a different hole 39 rotating the inner and outer longitudinal rods 70 and 77 respectively and threading the bolt 84 into the threaded aperture 83. A wrench can be used to grasp the nut 72 to thus rotate the inner and outer longitudinal rods 70 and 77. If it is desired to change the relative location of the associated spike teeth covers 60, then nut 72 must be removed and reinserted into the proper threaded aperture 80 to attain the desired relative location of the associated spike teeth cover 60.

Connecting means are provided between the inner and outer longitudinal rods 70 and 77 respectively and the rearward and forward spike teeth covers 60 such that rotation of the rods causes an adjustment in the location of the spike teeth covers 60. A first embodiment of the connecting means is shown in FIGS. 1, 2 and 3 and a second embodiment is shown in FIGS. 4 and 5.

Referring now to FIGS. 1, 2 and 3, wherein a first embodiment of the connecting means between the rods and the spike tooth covers is illustrated. Crank arms 90 secured by means such as 91 to the rods 70 and 77. There are at least two crank arms 90 for each of the associated spike teeth covers 60. Bifurcated plates 93 are secured at their bight portion to the flat shield portion 61 of the spike teeth covers such that the bifurcated legs extend toward the central core 33. The bifurcated legs are dimensioned such that they pass through the radial bars 47 of the grate 45. A link 94 is secured at one end by nuts and bolts 95 to the free ends of the bifurcated legs and at its other end is connected by a rod 96 to the crank arm 90. As best seen in FIG. 3, crank arm 90 has an elongated slot 92 formed therein which is adapted to receive the rod 96. The elongated slot 92 permits the required lost motion in transmitting the rotational movement of the rods 70 and 77 to the desired reciprocating motion of the spike teeth covers 60. L-shaped retaining means 97 are secured as by welding to the flange portion 62 of the spike teeth covers 60 and engage the edge of the longitudinally extending member 43 adjacent to the trailing edge 50 of the spike teeth 48.

Referring now to FIGS. 4 and 5, wherein there is illustrated a second embodiment of the means connecting the rods 70 and 71 to the spike teeth covers 60. Pinions 100 are secured by means 101 to the rods 70 and 77. A bifurcated plate 104 is secured to the flat shield portion 61 of the spike teeth covers 60 such that the free legs extend toward the central core 33. The free legs of the bifurcated plate 104 are dimensioned to pass between the radial bars 47 of the grate 45. A plate 102 having a rack 103 secured thereto is connected by nuts and bolts 105 to the bifurcated plate 104. The bifurcated plates 104 and plates 102 are thus connected together such that movement of the connected plates is restrained by the radial bars 47 of the grate 45. The pinions 100 mesh with the racks 103 and thus rotational movement of the rods 70 and 77 is transformed into reciprocating movement of the spike teeth covers 60.

It should be understood, of course, that the foregoing disclosure relates to only preferred embodiments of the invention and the numerous modifications of alterations may be made therein.

What is claimed is:

1. A rotor for a combine comprising:
   an elongated central core;
   a plurality of blades extending longitudinally of said core and radiating outwardly therefrom, each of said blades include, a plurality of outwardly extending arms terminating in outer ends, groups of said outwardly extending arms lying in respective planes extending lengthwise of said central core, longitudinally extending members respectively associated with each of said groups and secured to said outer ends of the arms of its associated group, a plurality of spike teeth secured to said longitudinally extending members and extending radially outwardly from said core, said spike teeth having a leading edge and a trailing edge, spike teeth covers, and means for adjustably mounting said spike teeth covers on said rotor such that they can be located with respect to the associated longitudinally extending member at an extended position at which the leading edges of the associated spike teeth are covered, or at a retracted position at which at least a portion of the associated leading edges are exposed, said means for adjustably mounting said spike teeth covers include, longitudinal rods journaled on the associated outwardly extending arms, means for rotating said longitudinal rods, retaining means for securing said longitudinal rods in a selected position relative to the associated outwardly extending arms, and connecting means between the associated longitudinal rods and spike teeth covers such that rotation of the longitudinal rods causes adjustment in the position of the associated spike teeth covers.

2. The invention as set forth in claim 1 wherein said connecting means includes, crank arms secured to associated longitudinal rods, linkage means connecting the free end of each crank arm to its associated spike teeth cover and guide means confining the movement of said spike teeth covers to a path radially of said core.

3. The invention as set forth in claim 1 wherein said spike teeth covers include a flat shield portion adapted when in this extended position to cover the leading edges of the associated spike teeth and a flange portion extending from the outer edge of said shield portion towards the trailing edge of the associated spike teeth, wherein said connecting means includes, pinions secured to said longitudinal rods, racks connected to said spike teeth covers and adapted to be in engagement with associated pinions such that said spike teeth covers are movable from the extended to the retractable position upon rotation of the associated longitudinal rod.

4. The invention as set forth in claim 1 wherein said spike teeth covers include a flat shield portion adapted when in this extended position to cover the leading edges of the associated spike teeth and a flange portion extending from the outer edge of said shield portion towards the trailing edge of the associated spike teeth.

5. The invention as set forth in claim 2 wherein said spike teeth covers include a flat shield portion adapted when in this extended position to cover the leading edges of the associated spike teeth and a flange portion extending from the outer edge of said shield portion towards the trailing edge of the associated spike teeth.

6. The invention as set forth in claim 1 wherein said connecting means includes, pinions secured to said longitudinal rods,
racks connected to said spike teeth covers and adapted to be in engagement with associated pinions such that said spike teeth covers are movable in response to rotation of the associated longitudinal rod.

7. The invention as set forth in claim 3 wherein rasp bars are secured to said flange portions.

8. A rotor for a combine including a central core, longitudinally extending members fixedly supported by said core and spaced therefrom, a plurality of spike teeth secured to said longitudinally extending members and extending radially outwardly from said core, said spike teeth having a leading edge and a trailing edge, spike teeth covers and means for adjustably mounting said spike teeth covers on said rotor such that they can be located with respect to an associated longitudinally extending member at an extended position at which the leading edges of the associated spike teeth are covered, at a retracted position at which the associated leading edges are exposed or intermediate positions therebetween, wherein said means for adjustably mounting said spike teeth covers include associated longitudinal rods journaled on said rotor, means for rotating said longitudinal rods, retaining means for securing said longitudinal bars in selected positions relative to said rotor, and connecting means between the associated longitudinal bars and spike teeth covers such that rotation of the longitudinal bars causes adjustment in the position of the associated spike teeth covers.

9. The invention as set forth in claim 8 wherein said connecting means includes, crank arms secured to the longitudinal bars, linkage means connecting the free ends of the crank arms to its associated spike teeth cover and guide means confining the movement of said spike teeth covers to a path substantially radially of said core.

10. The invention as set forth in claim 8 wherein said spike teeth covers include flat shield portions adapted when in the extended position to cover the leading edges of the associated spike teeth and a flange portion extending from the outer edge of said shield portions toward the trailing edges of the associated spike teeth.

11. The invention as set forth in claim 9 wherein said spike teeth covers include flat shield portions adapted when in the extended position to cover the leading edges of the associated spike teeth and a flange portion extending from the outer edge of said shield portions toward the trailing edges of the associated spike teeth.

12. The invention as set forth in claim 8 wherein said connecting means includes, pinions secured to said longitudinal bars,
racks connected to said spike teeth covers and adapted to be in engagement with associated pinions such that said spike teeth covers are movable from the extended to the retracted position upon rotation of the associated longitudinal bar.

13. A rotor for a combine comprising:
an elongated central core having forward and rear ends,
a plurality of blades extending longitudinally of the core and spaced apart circumferentially thereof,
  each of said blades having:
    an outer edge spaced from said core, each outer edge including a longitudinally extending member, and a plurality of spike teeth secured at intervals to said longitudinally extending member and extending from the forward to the rear end of the rotor;
a plurality of associated spike teeth covers, each extending longitudinally of the rotor and together extending the length of said longitudinally extending member;
means adjustably mounting said plurality of associated spike teeth covers such that each spike teeth cover can be located with respect to the associated longitudinally extending member at an extended position at which the corresponding spike teeth are covered, or at a retracted position at which at least a portion of the corresponding spike teeth are exposed, wherein said means for adjustably mounting said plurality of associated spike teeth covers include a plurality of rods, one for each of said associated spike teeth covers, means journaling each rod on said blade, means for rotating each of said rods, retaining means for securing each of said rods in a selected position relative to said blade, and means connecting each of said rods to a corresponding spike teeth cover such that rotation of a rod causes adjustment in the position of the corresponding spike teeth cover.

14. The invention as set forth in claim 13 wherein said spike means connecting each of said rods to a corresponding spike teeth cover include, pinions secured to said rods, racks connected to each of said spike teeth covers and adapted to be in engagement with the associated pinion such that said spike teeth covers are movable in response to rotation of the associated rod.

15. A rotor for a combine including a central core,
longitudinally extending members fixedly supported by said core and spaced therefrom,
a plurality of spike teeth secured to said longitudinally extending members and extending radially outwardly from said core, said spike teeth having a leading edge and a trailing edge,
spike teeth covers and means for adjustably mounting said spike teeth covers on said rotor such that they can be located with respect to an associated longitudinally extending member at an extended position at which the leading edges of the associated spike teeth are covered, at a retracted position at which the associated leading edges are exposed or intermediate positions therebetween,
said spike teeth covers include flat shield portions adapted when in the extending position to cover the leading edges of the associated spike teeth and a flange portion extending from the outer edge of said shield portions toward the trailing edges of the associated spike teeth,
rasp bars secured to said flange portions,
and wherein said connecting means include, pinions secured to said longitudinal bars, racks connected to said spike teeth covers and adapted to be in engagement with associated pinions such that said spike teeth covers are movable from the extended to the retracted position upon rotation of the associated longitudinal bar.

16. The invention as set forth in claim 15 wherein rasp bars are secured to said flange portions.

References Cited

UNITED STATES PATENTS

| | | | |
|---|---|---|---|
| 3,410,271 | 11/1968 | Henzen et al. | 130—27 R |
| 1,581,835 | 4/1926 | Brown | 130—27 L |
| 2,050,631 | 8/1936 | Schlayer | 130—27 T |
| 3,401,727 | 9/1968 | Blanshine et al. | 130—6 |
| 3,534,742 | 10/1969 | Knapp et al. | 130—27 T |

FOREIGN PATENTS 212,091    4/1957    Australia.

ANTONIO F. GUIDA, Primary Examiner

U.S. Cl. X.R.

130—27 T